Feb. 26, 1957 H. E. OWEN 2,783,118
PHOTOGRAPHIC RECORDING OF TRANSIENT SIGNALS
Filed Aug. 20, 1953
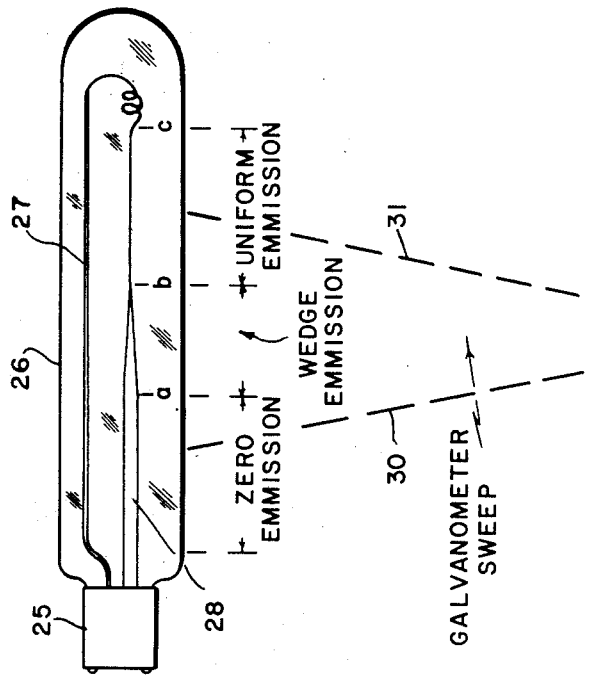
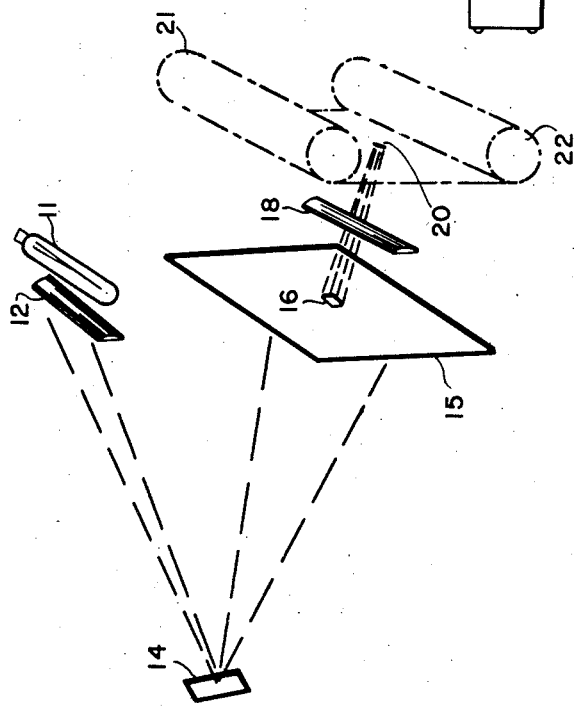
Herbert E. Owen  Inventor
By W.O. Heilman  Attorney

United States Patent Office 2,783,118
Patented Feb. 26, 1957

2,783,118

PHOTOGRAPHIC RECORDING OF TRANSIENT SIGNALS

Herbert E. Owen, Tulsa, Okla., assignor to Esso Research and Engineering Company, a corporation of Delaware Application August 20, 1953, Serial No. 375,323

3 Claims. (Cl. 346—109)

The present invention relates to a novel apparatus for making photographic records of transient signals. More especially, the invention concerns the recording of such signals in the form of photographic records in which the density of the photographic recording varies in proportion to the signal. A particular feature of the invention is the provision of a novel constant current lamp that furnishes a varying intensity light beam for such recording. The invention is especially useful in the making of seismic records in geophysical exploration.

One method of geophysical exploration that has been in use for some time is that known as seismic prospecting. Briefly this method consists in initiating a seismic disturbance at a selected point on or adjacent the earth's surface and detecting reflected seismic waves at a plurality of points spread out in a selected pattern on the earth's surface. The seismic waves are detected with sensitive instruments known as seismometers or geophones which translate the detected motion into electrical impulses which are then fed to suitable amplifiers and recorded on a seismograph. By simultaneously providing the seismic record with suitable timing marks it is possible to determine from the record the length of time required for the arrival of seismic waves at each of the detection points either directly from the seismic source or by reflection from underlying geological strata. From these arrival times and from other data pertinent to the area being studied, such as seismic wave velocities in the various earth layers, it is then possible to calculate the depths of the various reflecting substrata.

Oscillograph records of detected seismic waves obtained as just described when made in favorable areas may often be examined visually to pick out prominent reflections which will show up as similar transients that line up on the adjacent traces of the record. However, in many instances such reflections are difficult to distinguish because of the complexity of the wave forms. It has more recently been noted that if the detected impulses are recorded in the form of variable density photographic records many more reflections can often be noted. Suitable means for making such variable density records are described, for example, in U. S. Patent 2,051,153 of Frank Rieber.

When recording transients in the form of variable density photographic records, it has been the usual practice to employ an incandescent lamp that varies in brightness in relation to the voltage fed to it. For best results the lamps must be carefully selected for their response characteristics. Furthermore, as disclosed in the aforementioned Rieber patent, the lamps must be small when they are used for seismic recording in view of the necessity for close spacing when recording a number of tracks or channels on a single film. There are a number of disadvantages associated with the use of such lamps. For example, since the lamps have a thermal lag the photographic record tends to be distorted somewhat and a complicated electric circuit is needed to overcome this. Furthermore, when using the required electrical set-up to overcome lamp distortion a 100% modulation in the voltage fed to the equipment results in only 5% modulation in the light from the lamps. It is therefore necessary that the recording film have high contrast. This in turn leads to considerable photographic distortion, which is a disadvantage, particularly if the variable density record is to be played back for reproduction in another form.

In application Serial No. 254,331 of Jesse D. Skelton, filed November 1, 1951, there is disclosed and claimed an apparatus for recording electrical transients directly as variable density photographic records on photographic media while detecting the transients with a galvanometer, thus obviating the need for a modulated light source. In the invention of the aforesaid application, light from a suitable source passes through a variable density filter that increases in light transmission properties uniformly along its length, thereby providing a transmitted beam that increases uniformly in light intensity across its width. This transmitted beam strikes a conventional galvanometer mirror whose axis of rotation is perpendicular to the width of the light beam. Thus the intensity of the light reflected from the beam by the mirror toward a given point or area will vary with the signal fed to the galvanometer. By directing the reflected beam against a barrier having an aperture of selected size and shape and by moving a photographic medium past the aperture on the other side of the barrier at a predetermined rate of speed, a record of the detected transients can be obtained.

One disadvantage of the arrangement of the aforementioned Skelton device is that the variable density filter necessary for its proper operation requires considerable care in its construction. Also, when the filter has been prepared by exposing a portion of photographic film to uniformly increasing amounts of light along its length and then developing the film in the usual manner, such a filter tends to deteriorate with age, especially if care is not taken to prevent exposure of the filter to the heat of the light source for more than a few seconds at a time.

It is an object of the present invention to provide an apparatus for recording electrical transient signals in the form of variable density photographic records without requiring the use of a modulated light source or of a variable density filter. Another object of the invention is to provide a constant current straight line filament lamp that will produce a light beam that changes uniformly in light intensity across at least a portion of its width whereby to enable the recording of transients directly as variable density records on photographic media while detecting such transients with a galvanometer.

The nature and objects of the invention will be more fully understood when reference is made to the accompanying drawings in which:

Fig. 1 is a schematic diagram of an arrangement of light source, galvanometer, baffles and photographic recording medium to practice the invention; and, Fig. 2 illustrates a constant current lamp providing variable light emission in accordance with the present invention.

With particular reference to Fig. 1, light from a straight line filament lamp 11, which lamp is a particular feature of the present invention, passes through a lens 12 whose purpose is to condense the height of the beam. The use of the lens is not absolutely essential, although it is practical to employ such a lens for more efficient utilization of the light from lamp 11. As will be described in the discussion of Fig. 2, the light beam from lamp 11 changes in intensity across its width. A galvanometer mirror 14 reflects the beam toward a light barrier 15 in which is provided an aperture 16. Galvanometer mirror 14 is of the type employed in conventional seismograph recorders and rotates on its vertical axis in response to voltages received by the galvanometer. A small portion of the light beam reflected by mirror 14 passes through the aperture, after which it is focused by cylindrical lens 18 into a line image 20 on the photographic medium 19. The latter may be carried by a pair of rollers 21 and 22 which move the photographic recording medium past the image focus point at a predetermined speed. Alternatively, the medium may be mounted upon a drum much in the manner disclosed in the aforementioned Rieber patent.

As in the system described in the aforementioned Skelton application, the intensity of the light that passes through the aperture 16 in barrier 15 will be determined by the relative rotational position of the mirror 14 with respect to the aperture. Since the rotation of mirror 14 will be proportional to the signal received by the galvanometer, it follows that the intensity of light emerging from the aperture 16 and falling on the recording medium 19 will be proportional to the signal fed to the galvanometer.

A detailed view of the constant current straight line filament lamp that provides a beam of light changing in intensity across its width in accordance with the present invention is shown in Fig. 2. The lamp has a conventional base 25 and a conventional envelope 26 within which are positioned a filament support 27 and a filament 28. The filament is of novel construction in that it comprises an essentially straight line element having a lower or base portion of a considerably larger diameter than its upper portion, the two portions being joined by an intermediate section of generally uniform wedge-shaped longitudinal cross section whose diameter decreases from that of the base portion to that of the upper portion. The dimensions of the filament are so chosen that for the current rating of the lamp the base portion of the filament will not be incandescent, whereas the remaining portion of the filament will be incandescent. That portion of the filament from point $b$ to point $c$ will emit light of uniform intensity along its length, whereas the portion of the filament from point $a$ to point $b$ will emit light of increasing intensity from point $a$ to point $b$. Thus, if the galvanometer mirror is so positioned with respect to the lamp that the mirror will pick up light falling within the lines 30 and 31, it will be seen that when the mirror is positioned to receive light travelling in the general direction of line 30 the light received will be of minimum intensity, whereas when the mirror is positioned to receive light travelling generally in the direction of line 31 the light will be of maximum intensity.

In general the difference in diameter between the thick base portion of the filament and the thinner top portion will be in the range of from about 5 to 1 to about 15 to 1. The lower limit in thickness differences will be dictated by the amount of light intensity difference desired and the upper limit by the tendency of a relatively thin filament portion to burn out when sufficient current is used to illuminate the wedge.

As a practical example for a lamp intended to operate at about 5 amperes at 13 volts, filament 28 may have a base portion of 0.03 inch diameter, and a thin portion, that is the portion from point $b$ to point $c$ in Fig. 2, of about 0.003 inch diameter, each of these portions being of the order of 1 inch in length, with the wedge portion, from point $a$ to point $b$, of about ½ inch in length. The filament may be constructed in any suitable manner and may conveniently be made of sintered powdered metal as for example sintered tungsten.

It is not essential that the wedge portion of the filament, that is the section from point $a$ to point $b$, change uniformly in thickness, i. e., that the lines defining the section between points $a$ and $b$ in Fig. 2 be straight lines, but instead these may have concave or convex curvature. In some instances it may be desirable to have a non-uniform change in light emission along the wedge, as for example to allow for changes in the color of the light emitted from the thicker portions of the wedge as compared to that of the thinner portion when using film that is not equally sensitive to all colors.

Also, although the filament is most conveniently constructed to have a circular transverse cross-section, other shapes may also be used.

It is not intended that this invention be limited by the specific embodiments described. The scope of the invention is to be determined by the appended claims.

What is claimed is:

1. An apparatus for making a variable density photographic record of an electrical transient which comprises a reflecting mirror galvanometer whose mirror is rotationally responsive to the magnitude of said transient, a straight line filament lamp arranged to direct an incident beam of light toward said mirror, the filament in said lamp including a wedge-shaped portion diminishing in thickness along its length to emit a light beam having progressively increasing intensity along its width, the width measurement of said beam lying in a direction substantially normal to the axis of rotation of the mirror, a light barrier provided with a centrally disposed aperture, the barrier being positioned relative to the mirror such that the beam of light reflected by the mirror from the lamp impinges upon the barrier with a portion of the reflected beam passing through the aperture, rotational movements of the mirror causing different portions along the width of the reflected beam to pass through the aperture, a photosensitive medium adjacent said barrier and arranged such that light passing through the aperture from the mirror impinges upon the medium, and means for moving said medium relative to the aperture.

2. An apparatus as defined by claim 1 in which the thickness ratio between the thick end of the wedge-shaped filament portion and the thin end thereof is within the limits from about 5 to 1 to 15 to 1.

3. An apparatus as defined in claim 1 in which a cylindrical lens is positioned intermediate said lamp and said galvanometer mirror to focus light from the lamp upon the reflecting surface of the mirror.

References Cited in the file of this patent

UNITED STATES PATENTS

| | | |
|---|---|---|
| 248,418 | Edison | Oct. 18, 1881 |
| 2,140,003 | Engl et al. | Dec. 13, 1938 |
| 2,493,534 | Hawkins | Jan. 3, 1950 |
| 2,499,593 | Kreuzer et al. | Mar. 7, 1950 |